Patented Feb. 3, 1948

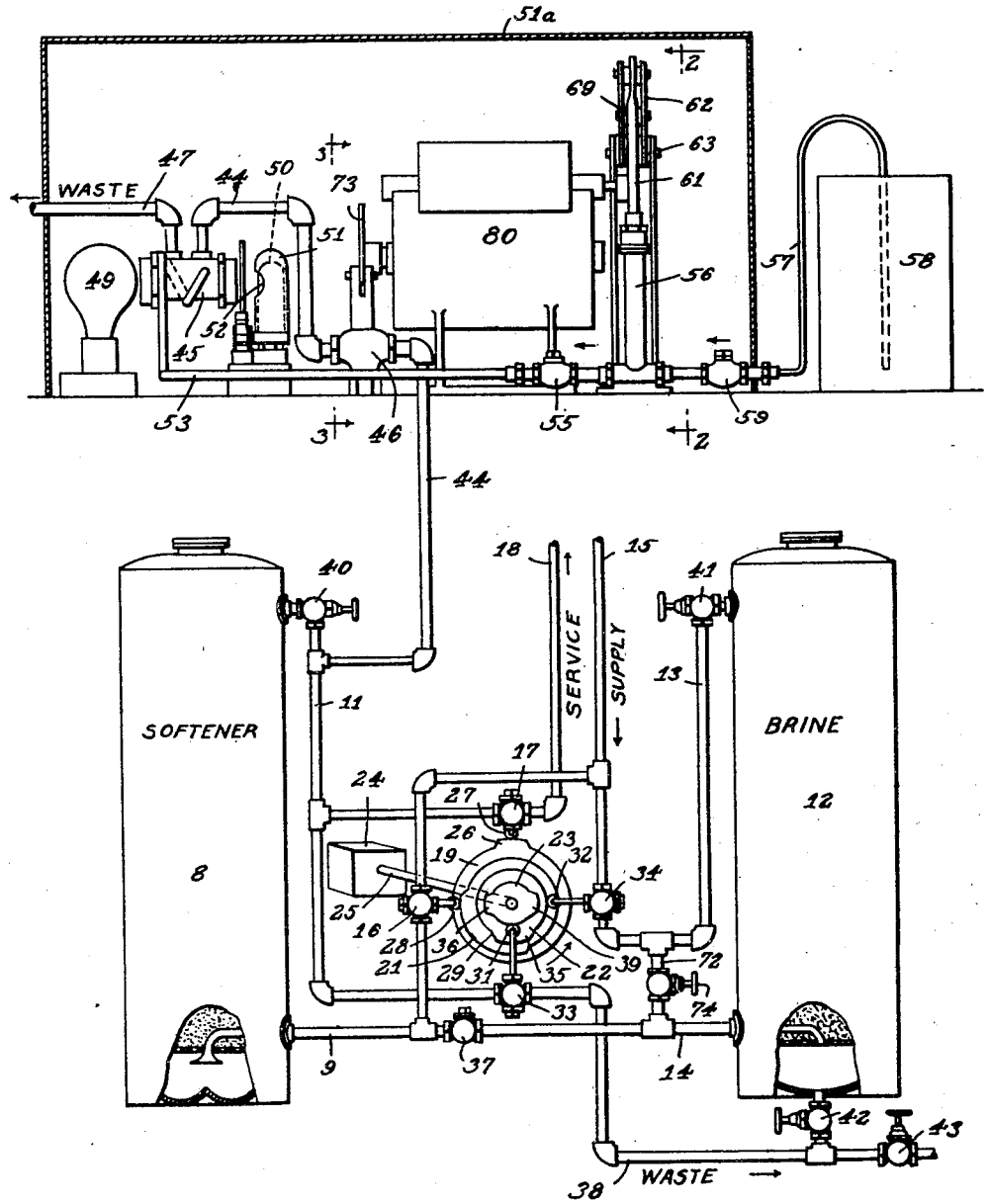

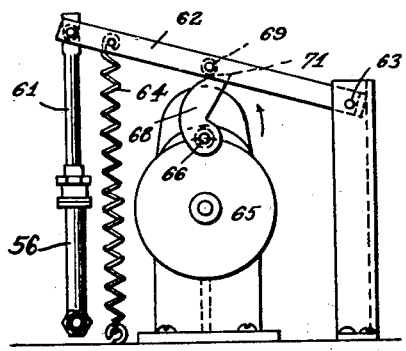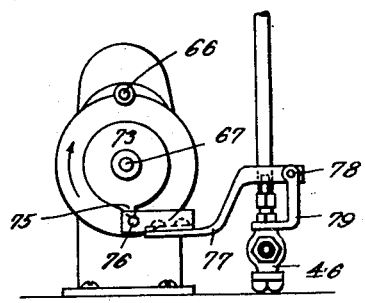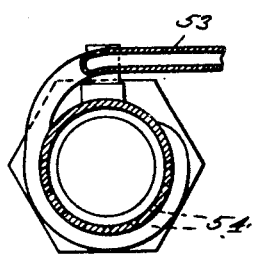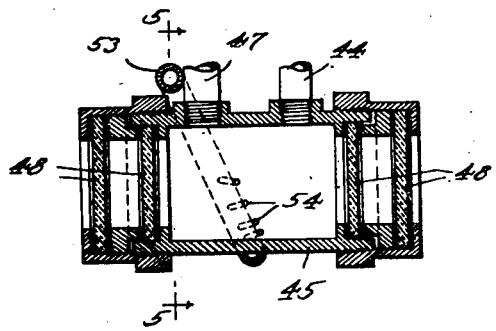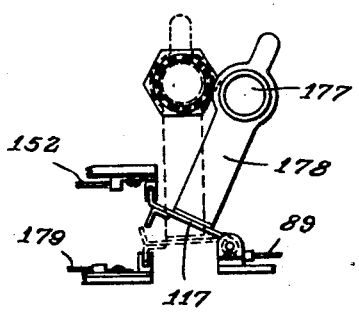

2,435,366

UNITED STATES PATENT OFFICE 2,435,366

AUTOMATIC WATER SOFTENER

Arthur L. Riche, Rockford, Ill., assignor to Automatic Pump & Softener Corporation, Rockford, Ill., a corporation of Illinois Application January 27, 1934, Serial No. 708,589

4 Claims. (Cl. 210—24)

This invention relates to water softeners of the base exchange type and has particular reference to automatic and semi-automatic water softeners wherein regeneration may be automatically initiated and the softener controlled through a part or all of its cycle from the character of the effluent water.

In the past, automatic and so-called semi-automatic water softeners have been set into regeneration upon the passage of a certain amount of water through the softener, the water being measured by a meter. The various steps or phases of the regeneration cycle have been commonly carried out by meter or time controls. This method of operation is objectionable in that the softener is set into regeneration upon the passage of a predetermined quantity of water regardless of whether or not the bed of base exchange material has become exhausted. Thus, when the water decreases in hardness below that used in the calculations for setting the meter, regeneration occurs prior to exhaustion of the bed, and, likewise, when the hardness of the water increases, the softener ceases to function in softening the water, prior to regeneration. Either hard water appears in the effluent line or salt is unnecessarily wasted through regenerating too soon. It is also well known that the volume of water softened by a zeolite softener between any two regenerations varies materially even under apparently identical conditions, which variable performance cannot be cared for by meter control. Time controls for controlling the steps of the regeneration cycle are generally equally inefficient, as for example, during the brine intake step, brine may be lost by an excessive amount passing through and out of the softener into the drain before the brine intake valve is closed. Similarly, during the washing step, the period of time or alternatively the amount of water required to completely wash the brine from the mineral may vary, and, as a consequence, soft water may be wasted if the washing is excessive or the softener may be returned to service before the mineral is completely washed, so that brine is carried into the soft water system.

An object of the invention is to provide a water softener wherein the effluent water is subjected to test and regeneration is brought about in response to test.

A further object of the invention is to provide an automatic water softener wherein the effluent water is subjected to test and the several steps of the cycle are automatically carried out in response to such tests.

Another object of the invention is to provide a softener wherein the effluent water is subjected to a test for hardness and the regeneration is automatically initiated in response to the presence of hardness in the softener effluent.

I have also aimed to provide a water softener having means for initiating regeneration dependent upon the opacity produced in the effluent of the softener by the addition of a reagent capable of producing a precipitate or coloration with the hardness producing constituents of the water.

Another aim of the invention is to provide a water softener having light sensitive means for initiating regeneration and for controlling one or more steps of the regeneration cycle.

A still further object of the invention is to provide a water softener wherein a light sensitive cell serves in the testing of the effluent water for hardness and in which means are provided for actuating the softener when the effluent reaches a predetermined hardness.

A further aim of the invention is to provide a water softener wherein a signal is automatically emitted when the effluent water reaches a predetermined hardness, the regeneration being manually initiated, and other steps of the regeneration cycle being controlled through automatic testing of the softener effluent.

Another object of the invention is to provide a water softener having means for automatically testing the effluent during the regeneration cycle of the softener to determine when the brine has passed through the softener and for initiating action of the valves in response to said test.

A further object is to provide a softener wherein the wash water is tested for brine residue and the valves are operated in response to said test to return the softener to service.

Another object of the invention is to provide a softener wherein the effluent is tested for brine and the valves thereof are actuated in response to a predetermined concentration of brine, to regulate the volume of saturated brine used at each regeneration.

Still another object of the invention is to provide improved means for controlling the addition of brine to the softener.

Another aim of the invention is to provide improved means for controlling the amount of saturated brine used at each regeneration.

Another object of the invention is the provision of means for varying the concentration of the brine used for regeneration, dependent upon the capacity of the mineral.

I have further aimed to provide a water softener wherein the effluent is periodically tested and wherein the period between tests is automatically varied during different phases of the regeneration cycle.

A still further object of the invention is to provide a softener wherein testing means are provided for periodically testing the effluent, the testing means including manually operating means for calibrating the same.

Other objects and attendant advantages will become apparent to those skilled in the art from the following description and the accompanying drawings, in which—

Figure 1 is a view more or less in diagram, showing a water softener embodying my invention;

Fig. 2 is a section on the line 2—2 of Figure 1, showing the reagent pump and operating mechanism;

Fig. 3 is a section on the line 3—3 of Figure 1, showing the control valve and operating mechanism;

Fig. 4 is an enlarged, central vertical section through the observation cell;

Fig. 5 is a section on the line 5—5 of Fig. 4;

Fig. 6 is a detail view of the test screen and switch, showing their positions relative to the observation cell.

Figure 7:
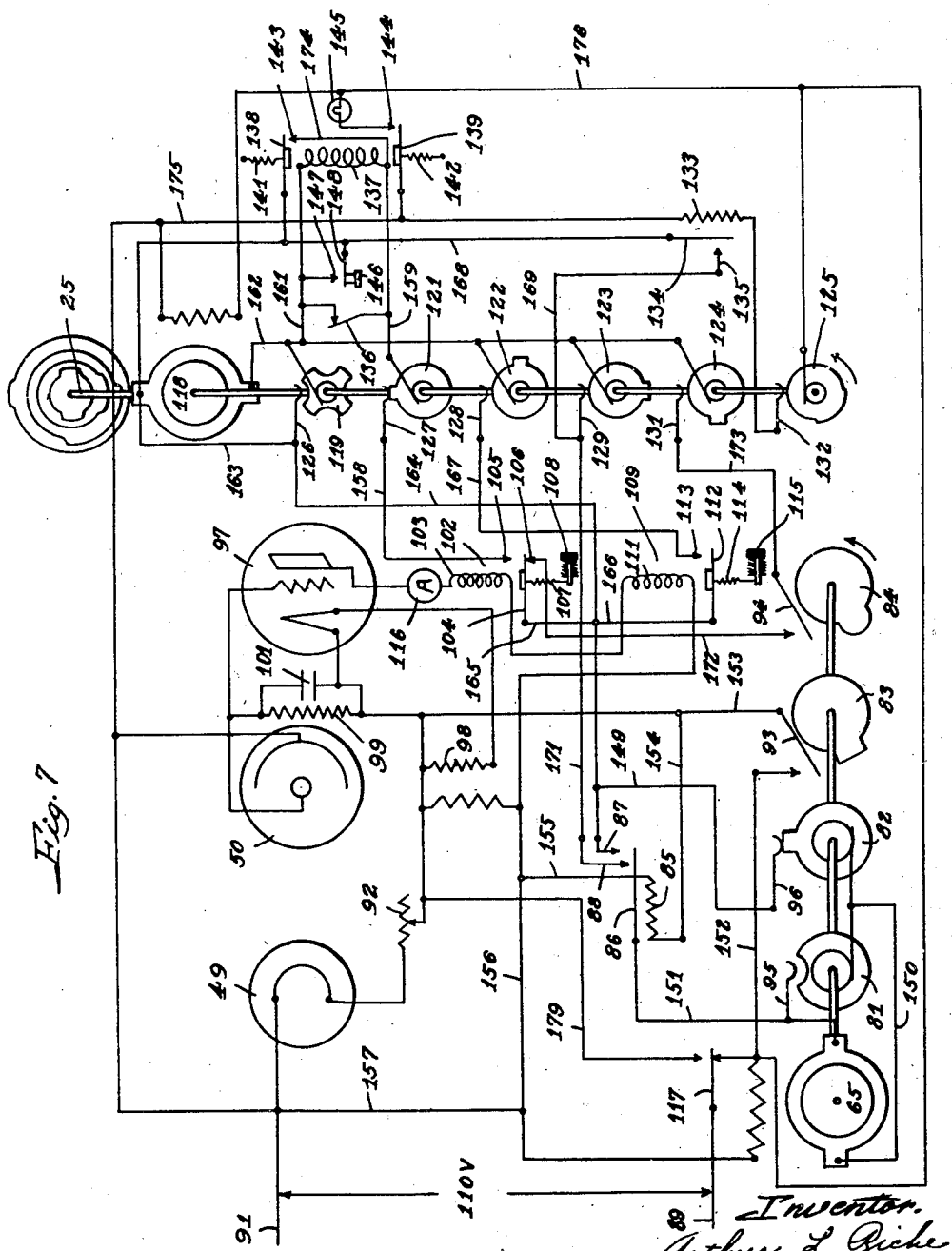
Fig. 7 is a wiring diagram of electric apparatus suitable for carrying out my invention.

The invention contemplates the provision of a water softener of the base exchange type wherein the regeneration cycle is carried out automatically and is initiated upon the appearance of hardness in the effluent of the softener, or alternatively by a switch arranged to be manually operated after the emission of a signal indicating that regeneration is required. Testing means are provided for automatically testing the effluent of the softener for hardness and for initiating operation of signal means or of a motor, upon the appearance of hardness, the motor serving to bring the softener into the first step of its regeneration or alternatively the motor may be manually initiated in response to the signal. The invention further contemplates means for testing the effluent of the softener during the brine intake phase of regeneration so as to determine when the incoming brine has passed through the bed of zeolite and appears in the effluent line of the softener, and means regulating the amount of saturated brine required to be fed to the softener from the brine tank before brine appears in the effluent to adjust the mechanism for minerals of different capacity. At this point, in response to the testing mechanism, the brine intake is cut off. The softener is also provided with means for testing the effluent from the softener during the rinse step to determine when the mineral has been completely washed and the effluent is free from brine residue whereupon the mechanism returns the valves to the service position by energizing the valve actuating motor.

The invention may be embodied with any of the numerous well known automatic water softeners, and I have herein shown it embodied with the essential features of a water softener shown and described in U. S. Letters Patent No. 1,713,105, issued May 14, 1929, to V. L. Tannehill. Referring first to Figure 1, I have shown, for purpose of illustration, mechanism having a softener tank, designated generally by the numeral 8, provided with a water inlet pipe 9 and a water outlet pipe 11. A brine tank, designated generally by the numeral 12, has an inlet pipe 13 and an outlet pipe 14. Raw water enters the system through a pipe 15, passes through a valve 16, and enters the bottom of the softener through the pipe 9. The effluent water from the softener normally passes through the pipe 11 and the valve 17 into the service line 18. A series of cams 19, 21, 22, and 23 control the flow of water through the softener system during the various phases of its operation and are driven from a valve operating unit 24, presently to be described, through a shaft 25. Alternatively the flow of liquids in the system may be controlled by a multiple port valve such as shown and described in U. S. Letters Patent No. 1,661,675, March 6, 1928, to V. C. Norquist, the valve being driven from the shaft 25.

While I have herein disclosed an upflow softener, the invention contemplates both upflow and downflow softeners, and combinations thereof, and the mechanism may be readily modified to control the same.

In Figure 1, the valves and cams are shown in the service position, a cam portion 26 of the cam 19 having contacted the cam follower 27 of the valve 17 to open this valve. Likewise, a cam follower 28 of the valve 16 rides on a cam surface 29 of the cam 21, retaining this valve in the open position. When the shaft 25 is given a quarter turn to rotate the cams in the direction of the arrow, the cam followers 27 and 28 of the valves 17 and 16 ride off the cam portions 26 and 29. Simultaneously, the cam followers 31 and 32 of valves 33 and 34 ride onto cam portions 36 and 35, opening the valves 33 and 34. Thereupon, raw water passes from the pipe 15 through the valve 34 and the line 13 into the top of the brine tank 12, displacing brine from the tank which flows through the outlet pipe 14 through a check valve 37 and the pipe 9, into the bottom of the softener tank 8. Brine rises in the softener tank 8 to the top of the tank, the water normally contained therein being forced out through the pipe 11, the valve 33, and a waste pipe 38 to the drain. The shaft 25 is then given another quarter turn, whereupon each of the valves 16, 17, 33, and 34 will be closed, allowing time for the reaction between the salt and the mineral in the softener tank 8. Upon a lapse of a predetermined time for this reaction to occur, the shaft 25 is given a further quarter turn, whereupon the cam followers 28 and 31 of valves 16 and 33, respectively, ride onto the cam portions 29 and 39, opening the valves. Raw water then flows from the pipe 15 through valve 16 and line 9 into the bottom of the softener tank 8 rinsing the brine from this tank through the line 11, valve 33, and waste pipe 38 to drain. The shaft 25 is then given another quarter turn, bringing the valves into the position shown in Figure 1 and returning the softener to service. Manually operated valves 40, 41, 42, and 43 may be provided in the softener system, if desired, for the purpose of manually shutting off the flow for repairs or other purposes.

In the present embodiment of my invention, I provide a small pipe 44 connected to the line 11 to receive effluent water from the softener tank 8. The pipe 44 delivers a small portion of the effluent to an observation cell 45. The flow of water to the cell is controlled by a valve 46 in the pipe 44. An outlet pipe 47 from the cell 45 communicates with the top of the cell and is arranged to retain a measured sample of the water in the cell when the supply is cut off at the valve 46. As best shown in Figs. 4 and 5, the cell 45 is, in this instance, substantially cylindrical in shape and is disposed with its axis horizontal. Other shapes of cells may, however, be used, and in different positions, and I do not intend to be limited to any particular shape. The ends of the cell 45 are provided with double lenses 48 arranged to transmit light from a suitable source 49 through the sample and to a light sensitive cell 50, or other element responsive to a change in radiant energy brought about by the absorption characteristics of the sample in the cell 45. The dead air space between the lenses serves as heat insulation to prevent formation of dew on the outer lens surface which might change the light transmitting characteristics of the lenses. The light sensitive cell 50 may, if desired, be enclosed in a metallic shield 51, having an opening 52 to receive the light passing through the lenses 48, the shield serving to exclude extraneous light. This shield is connected to ground and prevents a change in calibration of the circuit with a shifting of ground from one side of the power supply circuit to the other side. I have also found it advantageous, under certain circumstances, to enclose the testing mechanism in a box or hood 51a to further exclude extraneous light and humid air which might deposit dew on the observation cell lenses. As shown in Fig. 4, the incoming water from the pipe 44 is directed downward from the top of the cell 45 near one end and the outgoing water passes upward near the opposite end through the pipe 47. By this arrangement, the entire contents of the cell is changed or replaced quickly without leaving pockets which might retain the reagent or portions of a previously tested sample.

A suitable reagent for use in testing the sample in the cell 45 is introduced into said cell through a pipe 53 which extends spirally around the cell and communicates therewith through a series of small openings 54. The inflowing reagent from the openings 54 is directed into the lower periphery of the cell 45 and in such a direction as to produce a maximum of agitation with resulting thorough mixing of the reagent and sample to be tested. The reagent pipe 53 has a check valve 55 and is supplied with the reagent from a pump 56. This pump is in turn supplied with the reagent through a pipe 57 extending to a reservoir 58, a check valve 59 being provided in the pipe 57 to allow flow only toward the pump. A piston rod 61 for operating the piston in the pump 56 is connected to one end of a rocker arm 62 having a pivotal support 63 at its opposite end. The piston is normally drawn downward within the pump 56 by a coiled spring 64 connected to the arm 62 and the pump is actuated by an electric motor 65. The motor is arranged to drive, through suitable speed reducing gears within the motor casing, shafts 66 and 67, the two running at the same speed and in the same sense. Fixed on the end of the shaft 66 is a cam 68 disposed in operative relation to a roller 69 on the arm 62. The cam 68 is formed with a projection 71 from which the roller 69 drops abruptly when the shaft 66 is rotated in the direction indicated by an arrow in Fig. 2 so that in the arrangement shown, the pump 56 is operated to inject a quantity of reagent once during each complete revolution of the shaft 66.

To periodically actuate the valve 46 a cam 72 is fixed on the shaft 67 and formed with a projection 75. A pin 76 is disposed on a lever arm 77 in the path of the projection 75 and a spring within the casing of the valve 46 normally holds it in closed position. The valve stem engages the arm 77 to urge it upward, with a supporting pivot 78 as a fulcrum, and in such a position that the pin 76 is retained in the path of the projection 75. A suitable bracket 79 is secured to the valve 46 to support the arm 77. Thus, the valve 46 is held in open position when the pin 76 is in engagement with the projection 75, as shown in Fig. 3 and is closed when the shaft 67 is rotated to remove said projection from the pin 76.

Suitable electric control circuits and apparatus are provided for indicating changes in the light absorption characteristics of the sample such as changes in turbidity or color of the sample in the cell 45 and for actuating the valves of the softener, as shown in Fig. 7. The motor 65 is of the repulsion type, such as that described in United States Letters Patent No. 1,078,439 to Charles B. Hoffman for Repulsion motor control system, dated November 11, 1913. The motor 65 is carried in a housing 80 and operates through reduction gearing within the housing to drive the valve 46 in the water sample line, the reagent pump 56 and electrical switch cam designated generally by the numerals 81, 82, 83, and 84. The numeral 85 designates the heating element of a thermal timer and the numeral 86 designates the bi-metallic blade thereof. The numerals 87 and 88 designate the contact points adapted to be contacted by the blades 86 upon cooling thereof, the blades moving away from these contact points upon being heated by the element 85. The contact point 88 is located so that it will contact the bar 86 before the contact point 87, it being yieldingly mounted so that the movement of bar 86 will not be materially retarded by the pressure of contact between 88 and 86. The numerals 89 and 91 designate the two power supply lines for supplying power to the mechanism. 92 is an adjustable rheostat adapted to function in the calibration of the testing mechanism in a manner presently to be described. 93 and 94 are switches adapted to be actuated upon rotation of the cam elements 83 and 84. 95 and 96 indicate brushes adapted to be contacted by the cams 81 and 82 at predetermined positions in the rotation of the latter. 97 is a conventional amplifying tube. 98 is a transformer for supplying low voltage to the tube filament. 99 is a high resistance and 101 is a condenser of small capacity. 102 is a relay in the plate circuit of the tube 97 having a coil 103, a switch element 104 and upper and lower contacts 105 and 106. The relay has a return spring 107 adjustable by means of a thumb screw 108. 109 is a relay in the plate circuit of the tube 97 having a coil 111, a switch element 112 and a single contact 113, a spring 114 serving to return the element 112, and a thumb screw 115 serving to adjust the tension of the spring 114. 116 is an ammeter in the plate circuit of the tube 97. 117 is a switch, presently to be described more in detail, for the purpose of cutting off the supply of current to the motor 65 and to the valve actuating motor to calibrate the testing mechanism. 118 is a motor for actuating the valve operating cams and is normally housed in the casing 24, the motor serving to drive the shaft 25. 119, 121, 122, 123, 124, and 125 are cams on the shaft of the motor 118. 126, 127, 128, 129, 131, and 132 are brushes adapted to contact the cams 119, and 121 through 125 during a portion of each revolution thereof. 133 is the heating element of a thermal timer having a bi-metal blade 134 adapted to move toward and away from a contact point 135, heating of the blade causing the same to contact the point 135 and close the circuit therethrough. 136 is a switch arranged to be positioned in either a closed position, as shown in Fig. 7, or an open position. 137 is a relay rendered operative only when the switch 136 occupies its open position, the relay having switch elements 138 and 139, return springs 141 and 142 and contacts 143 and 144. 145 is a signal lamp and 146 is a push button having contacts 147 and 148 adapted to be closed by manual operation of the button to start the motor 118 from any of its positions.

Operation

Attention is directed to the fact that the volume of saturated brine required to regenerate the mineral in the softener tank 8 depends upon the capacity of the mineral. Therefore, mineral of high capacity requires a greater volume of brine than mineral of low capacity. In order that sufficient brine will have been supplied to the softener mineral when brine appears at the effluent, either of two methods may be employed. First, the amount of free board in the softener may be adjusted dependent upon the capacity of the mineral. This method is, however, only applicable to upflow softeners. Secondly, a by-pass such as shown at 72, connecting the pipes 13 and 14, may be used having a valve 74, adjustable to regulate the flow through the by-pass. Under such circumstances, the softener tank is made sufficiently large to care for the mineral of highest capacity and for minerals of lower capacity the concentration of the brine is regulated by adjusting the valve 74.

In Fig. 7, the parts are shown in their respective positions when the testing mechanism is at a point between successive tests, the valves of the water softener are in a service position and the switch 136 is closed. Soft water from the tank 8 is flowing through the observation cell 45 of the testing mechanism and the blade 86 is cooling. The blade 86 will first come against the contact point 88 at which time nothing will occur, this contact point serving a purpose presently to be more fully described. Upon continued cooling of the blade 86, the contact point 88 will be moved by the blade, permitting the latter to come into contact with the contact point 87 in due course. Thereupon the circuit through the rotor of the motor 65 will be closed through the contact point 87, the conductor 149, the brush 96, the cam 82, and conductors 150 and 151, to start the motor 65. The brush 96 and cam 82 remain in contact until the brush 95 engages the cam 81, whereupon the latter hold the circuit through the rotor of the motor throughout the remainder of the revolution of the cam 81. The motor then continues to run until the cams 81, 82, 83, and 84 have made one complete revolution. During the initial rotation of the cams, the supply of water to the observation chamber 45 is cut off by operation of the valve 46 and the reagent is injected into the sample by operation of the pump 56. Subsequently, and upon the lapse of a predetermined time, the cam 83 engages the switch member 93, closing the switch and energizing the lamp 49, the photo-electric cell 50 and the amplifying tube 97, current flowing from the power supply line 89 through the switch 117, conductor 152, the switch 93, and a conductor 153. Upon closure of the switch 93, a test of the fluid in the observation cell 45 is effected, light passing from the lamp 49 through the sample to the photo-electric cell 50. Upon closing the switch 93, current also passes through the heating element 85, from the conductor 153 through the conductor 154, the element 85, and the conductors 155, 156, and 157 to the power supply line 91. When the light passes through the sample in the observation cell 45, if no precipitate or coloration has been produced in the sample by the addition of reagent thereto, sufficient light passes through the sample and reaches the photo-electric cell 50 to cause the latter to put a negative bias on the grid of the amplifying tube 97 sufficient to prevent appreciable flow of current from the plate circuit through the relays 102 and 109. The relays are adjusted so that this amount of current is insufficient to pick up the relays and cause the closing of the switch elements 104 or 112. The amount of this current in the plate circuit, which is a measure of the opacity of the sample may be visually read on the ammeter 116. If desired, this ammeter may be a recording ammeter to give a permanent record of the condition of successive samples. Under the conditions just described, the cams 81—84 will complete their revolution without starting or in any way affecting the motor 118 of the valves of the softener, and the motor 65 and associated cams will be repositioned for the next successive test by the brush 96 engaging the cam 82 and the brush 95 becoming disengaged from the cam 81.

However, during the above mentioned test, suppose that a positive indication had occurred as indicated by the formation of a precipitate in the water of the observation cell 45 upon the addition of reagent thereto. This situation would correspond to the appearance of hardness in the effluent of the water softener. Under such circumstances the output of the photo-electric cell 50 would be decreased as a result of the decreased light incident thereon, thus decreasing the negative bias on the grid of the amplifying tube as a result of which the current in the plate circuit would increase. When the opacity of the sample in the cell 45 reaches a predetermined point, the current in the plate circuit will be sufficient to pick up the relay 102. The amount of current required to accomplish this may be adjusted by adjusting the tension on the retractor spring 107 of the relay 102.

The adjustments of the two relays 102 and 109 are such that a slight reduction of light passing through the sample increases the output of the plate circuit sufficient to pick up relay 102 while 109 remain open. Further reduction in the light passing through the observation cell causes the relay 109 to pick up, the switch element 112 contacting the point 113. Thus, when slightly hard water appears in the observation cell only the relay 102 will pick up in response to the test.

When the relay 102 picks up in response to hardness appearing in the observation cell, the switch element 104 is drawn into contact with the contact point 105 closing the rotor circuit of the motor 118 through the switch element 104, the contact point 105, the conductor 158, the brush 127, the cam 121, a conductor 159, the switch 136, and conductors 161, 162, 163, 164, and 165. It will be noted that as soon as cam 119 engages the brush 126 the circuit through the rotor of the motor 118 will remain closed throughout 90° of rotation bringing a new relation of cams 121—125 to their respective brushes. This 90° rotation of the motor rotates the shaft 25 through 90° and causes the cams 22 and 23 to open the valves 33 and 34, the valves 16 and 17 being closed by the cams 21 and 19. This admits brine to the softener tank and starts regeneration of the base exchange material in the softener 8. Simultaneously, the motor cam 122 is brought into contact with the brush 128.

In the meantime, tests are being conducted on the effluent from the softener at intervals determined by the rate of cooling of the blade 86. It will be plain that the interval between tests may be adjusted as desired or as required to meet the particular conditions by changing the relative position of 86 and 88. The motor 118 having turned through 90°, the softener is in the brine intake position and brine is being admitted into the bottom of the softener tank 8, the water in the tank being displaced. When all of the water has been displaced from the tank 8 and brine appears in the effluent, the sample of effluent received in the observation cell 45 for test will react with the reagent injected therein to form a precipitate which will materially obstruct the passage of light through the observation cell. When this occurs the negative bias of the tube 97 is insufficient to hold the plate current down and the relay 109 will pick up, causing the switch element 112 to contact the contact point 113. This closes the rotor circuit of the motor through the conductors 163, 164, 166, the switch element 112, the contact point 113, the conductor 167, the brush 128, the cam 122, and the conductor 162. Thereupon the motor 118 rotates the cam shaft through a second 90°, simultaneously moving the valve operating cam to the soaking position, in which all of the valves are closed. Thus, the volume of brine entering the softener is controlled by testing for the arrival of a predetermined concentration of brine at the outlet of the softener tank. In this position, cam 123 contacts the brush 129 and cam 125 contacts brush 132. The latter contact causes current to flow through the heating element 133 and warm blade 134 until it contacts the point 135, closing the rotor circuit of the motor 118 through a conductor 168, the blade 134, the point 135, the conductor 169, the brush 129, the cam 123, and the conductor 162, whereupon the motor 118 rotates the cam shaft through a further 90° angle, indexing the valve cams to the washing position and causing valves 16 and 33 to open, leaving valves 17 and 34 closed. This allows water to flow upwardly through the softener tank 8 and out of the top through the effluent line 11 and valve 33 to waste. The length of the soaking period is thus determined by the time required for the element 133 to cause the blade 134 to contact the conductor 135.

The motor 118 has now rotated through 270° from its starting position, and the cams 124 and 125 are in contact with the brushes 131 and 132 respectively. The latter contact being made, the heating element 133 continues to heat the blade 134 and maintain it in contact with the conductor 135. As a result of this contact, closing of the circuit between the blade 86 and the contact point 88 will cause actuation of the motor 65 by closing the circuit through the rotor of the motor 65 through the contact point 88, conductors 171 and 169, the point 135, the switch blade 134, the conductors 168, 163, 164, 149, brush 96, the cam 82, and the conductors 150 and 151. Since the distance required to be traveled by the blade 86 in cooling for contact with the point 88 is substantially less than that required for contact with the point 87, tests will be brought about at much more frequent intervals. This is desirable in order that the earliest possible indication that brine residue is washed from the softener may be secured. Contact of the cam 124 with the brush 131 places control of the next movement of the motor 118 onto the contact point 106 of the relay 102.

Where in the specification and claims I have used the term "brine," the term is intended to mean a concentrated salt solution such as used for regeneration and the term "brine residue" is intended to mean that portion of the brine, or of the reaction products of brine with the mineral, contained in the wash water during the washing steps.

Tests will now be conducted with much greater frequency than when soft water is passing through the observation cell. If the sample during any of these tests contains an appreciable amount of brine residue, a reaction will occur with the reagent injected therein and a stoppage of light will result in the observation cell. This reaction is primarily between the reagent and the calcium and magnesium salts resulting from the reaction of the brine and the mineral. When these salts are eliminated from the bed, the sodium chloride will necessarily have been eliminated because of its greater solubility. However, the salt commonly used for regeneration usually contains sufficient calcium and magnesium as impurities to give a reaction with the reagent of sufficient sensitivity that the test may also be used to indicate the substantial elimination of sodium chloride. As a result of this stoppage of light, upon closing of switch 93 by cam 83, switch element 104 of the relay 102 will be lifted, breaking contact with the contact point 106. Subsequent to this action, switch 94 is closed by cam 84, completing the circuit through the rotor of the motor 118 except for the open contact 106. However, when the sample passing through the observation cell 45 is sufficiently cleared of brine residue so that no appreciable stoppage of light occurs upon the injection of the reagent, the relay 102 will no longer pick up and the switch element 104 will remain in contact with the contact point 106. As a result, when the switch 94 is closed, the circuit through the rotor of the motor 118 will be closed through the contact point 106, a conductor 172, the switch 94, a conductor 173, the brush 131, the cam 124, the conductors 162, 163, 164 and 165, and the switch element 104, whereupon the motor 118 will rotate through the final 90° of its movement, rotating the valve cam to close the valve 33 and open the valve 17. The mechanism is then returned to the position shown in Fig. 7. Attention is directed to the fact that the cam 84 closes the switch 94 later than the cam 83 closes the switch 93, and likewise the cam 84 opens the switch 94 before the cam 83 opens the switch 93, thus synchronizing the operation of the switch 94 with the operation of the relay 102.

Attention is now directed to the operation of the softener when the switch 136 occupied its open position. This position of the switch causes the softener to operate in what has come to be called a semi-automatic manner, wherein the operator is given a signal when the softener becomes exhausted and is then required to start the regeneration cycle manually, whereupon the softener proceeds automatically through its regeneration cycle. This type of operation has the advantage that the supply of soft water is not shut off unexpectedly by regeneration.

When the switch 136 is open and hardness greater than the predetermined amount appears in the effluent, the test will cause relay 102 to function as described above, contacting switch element 104 with point 105, causing current to flow from the rotor of motor 118 through the coil of the relay 137 by conductors 162, 161, 159, cam 121, brush 127, conductor 158, contact point 105, element 104, and conductors 165, 164 and 163. The coil of the relay 137 is of such number of turns and resistance that sufficient current passes through it to pick up the switch elements 138 and 139 causing them to contact the points 143 and 144, respectively, but not enough current to cause the motor 118 to run. Contact between the switch element 138 and the point 143 causes current to continue to flow through the relay coil after relay 102 is deenergized, current flowing through conductor 168, element 138, contact 143 and conductors 174, 161, and 162. Operation of the relay also closes contact between the switch element 139 and contact point 144 and supplies power to the lamp 145 from the power line 91 by the conductor 175, the switch element 139, the contact 144, the conductor 176 and the switch 117 from the power line 89. The illumination of the lamp 145 indicates that the softener is exhausted and should be regenerated. Manual closing of push-button contacts 147 and 148 starts the motor 118, current flowing through the conductors 162, 161, the contacts 147 and 148, and conductor 168. The push-button must be held in contact long enough for the cam 119 to contact the brush 126 after which contact the motor 118 will continue to run and rotate its cam shaft through 90°, as previously described. Contacting of the push-button 146 also short circuits the winding of the relay 137 thus causing the release of the switch element 138 and breaking of the contact between said switch and the contact point 143 so that upon the release of said push-button the relay 137 will be found deenergized. From this point on, the various steps of drawing brine, soaking, rinsing, and return to service are accomplished exactly as previously described.

Attention is now directed to Fig. 6, wherein a part of the calibration means is shown. This consists of a screen 177 which may be carried on a switch lever 178, if desired, and arranged to actuate the switch element 117 shown in Fig. 7. It will be understood, however, that the screen and switch may be carried independently, if desired, and this has been found to be advisable under certain circumstances. The switch lever 178 is arranged to be manually moved between a position in which the screen or filter 177 rests across the end of the observation cell and a position which does not interfere wtih the passage of light through the observation cell. In the latter position the switch element 117 makes contact between the power supply line 89 and the conductor 152, whereas in the former position contact is made between the power supply line 89 and a conductor 179 leading to the variable resistance 92. Filter 177 is a filter and is sufficiently opaque to reproduce the opaqueness of the turbidity or color at which the operator desires the relay 102 to pick up. The variable resistance 92 is regulated to adjust the intensity of the lamp 49 so that the relay 102 will pick up at the opacity or color represented by the filter 177. The switch element 117 permits the motor to be thrown out of operation during the test period. By changing the density of the filter 177 the lamp intensity can be easily adjusted so relay 102 will pick up at any desired opacity or color.

Obviously, the frequency of the tests and the period between the segregation of the sample and the closing of the test circuit may be varied between wide limits without departing from the spirit of my invention. In the case of water in which hardness is approximately one-third due to magnesium salt, and two-thirds due to calcium salt, I have found that one minute between the injection of reagent and finish of the test gives closer and more accurate results than is required commercially. Where waters higher in magnesium are to be tested, this time interval may be increased by changing the gear ratio between motor 65 and its cam shaft or by shifting cams 83 and 84 to cause switches 93 and 94 to contact later in the cycle.

I have found that a suitable reagent for use in testing the hardness of water is a standard solution of a potassium salt of a non-volatile, fatty acid (of which corn oil has been found preferable), held in permanent solution by the addition of a sugar or glycerol and filtered at a low temperature.

My device affords either automatic or manual means for bringing about regeneration of the softener immediately upon the appearance of hard water in the effluent, that is, upon the exhaustion of the mineral. Furthermore, the mechanism is such that the softener may be thrown into regeneration or a signal emitted upon the appearance in the effluent of any predetermined degree of hardness. Regeneration need not necessarily be initiated at a slight degree of hardness, but may be initiated when the hardness progresses to an appreciable extent.

Attention is also directed to the fact that I have provided means whereby the introduction of brine into the softener is stopped as soon as brine of predetermined concentration appears in the effluent line of the softener. This insures the softener tank being full of brine during the soaking step with no danger of waste in the amount of salt used in regenerating the softener.

I have also provided means for returning the softener to service at the earliest possible moment by testing the wash water for brine residue and automatically initiating the return of the softener to service when the concentration of brine in the wash water reaches a predetermined amount. This has the effect of insuring that the washing has progressed sufficiently for soap economy and for freedom from ill effects when the water is used in a boiler, artificial ice plant, or elsewhere, and likewise insures that the softening mineral will not be over-washed, thus necessarily exhausting the mineral and wasting water.

It will be observed that my device serves not only to test for the appearance of brine in the effluent line of the softener during the brine intake step but, by the adjustment of the return spring of relay 109, permits a test for a definite concentration of brine at this point, which test represents a valuable advantage.

Another improved advantage of my construction lies in the fact that at two stages I am enabled to test for the appearance of predetermined opacity of the samples in the observation cell, and at another stage of the operation I am likewise enabled to test for the reduction or the disappearance of opacity in the sample, and that these tests are automatically conducted depending upon the steps of the regeneration cycle. I have also provided means for automatically starting automatic timing means for timing one portion of the regeneration cycle.

Another important characteristic of my device is the fact that the periods between tests is automatically changed for different steps of the regeneration cycle. I have also provided switch mechanism synchronized with the valve driving means for the purpose of controlling the frequency and type of test to be made by the test mechanism during a given step of the softener cycle.

Another feature of the invention lies in the fact that I have provided multiple relays in the same circuit adjustable so as to provide different points of pick-up so that different operations may be caused to take place as a result of a difference in the degree of opacity in the sample.

While I have thus described and illustrated a specific embodiment of my invention, it will be evident that numerous changes and alterations may be made within the spirit of the invention and I do not wish to be limited except as required by the prior art and the scope of the appended claims, in which I claim:

1. The combination in a base exchange water softener, of a softening tank, valve means for controlling the flow of water and brine to and from said tank, light sensitive testing means for testing the effluent from said tank by measuring the stoppage of light caused by the addition of a reagent to the effluent, means for driving said valve means in response to said test, and means for calibrating said testing means including a light filter for producing a known stoppage of light, the filter being manually movable to operative position, switch means for disconnecting said valve driving means, and means for manually adjusting the intensity of the light passing through said filter.

2. The combination in a base exchange water softener, of a brine tank, a softener tank of a size to hold sufficient saturated brine to regenerate a charge of mineral of maximum capacity, valve means for controlling the flow of water and brine to and from the softener tank, means for testing the effluent of said softener tank for brine, means for moving said valve means upon the appearance of brine in the effluent, and means for varying the concentration of brine admitted to the softener tank, dependent upon the capacity of the mineral.

3. The combination in a base exchange water softener, of a softening tank, valve means for controlling the flow of brine to said softening tank, and the flow of effluent therefrom, electrical relay means for controlling the operation of said valve means, light sensitive means for actuating said relay to operate said valve means when brine appears in the effluent to stop the flow of brine to said tank, and means for adjusting said electrical relay means to preselect the value of the brine concentration at which said valve means is operated.

4. The combination in a base exchange water softener, of a softening tank, valve means for controlling the flow of brine and water to said softener tank and the flow of effluent therefrom, electrical means for controlling the operation of said valve means, an energizing circuit for said electrical means, means for producing opacity in said effluent proportionate to certain characteristics thereof, light sensitive means for testing said effluent to measure the opacity thus produced, and a plurality of relays in said circuit operable in response to the electrical output of said testing means corresponding to different opacities.

ARTHUR L. RICHE.

REFERENCES CITED

The following references are of record in the file of this patent:

UNITED STATES PATENTS

| Number | Name | Date |
|---|---|---|
| 1,713,105 | Tannehill | May 14, 1929 |
| 1,661,675 | Norquist | Mar. 6, 1928 |
| 1,931,968 | Sweeney et al. | Oct. 24, 1933 |
| 1,954,405 | Dotterweich | Apr. 10, 1934 |
| 2,338,667 | Riche | Jan. 4, 1944 |
| 2,253,049 | Riche | Aug. 19, 1941 |
| 1,903,957 | Clark | Apr. 18, 1933 |